(12) United States Patent
Kitano et al.

(10) Patent No.: US 8,848,500 B2
(45) Date of Patent: Sep. 30, 2014

(54) OPTICAL READ/WRITE APPARATUS

(75) Inventors: Emi Kitano, Nara (JP); Harumitsu Miyashita, Nara (JP); Ryoji Hirose, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/981,150

(22) PCT Filed: Jul. 20, 2012

(86) PCT No.: PCT/JP2012/004623
§ 371 (c)(1),
(2), (4) Date: Jul. 23, 2013

(87) PCT Pub. No.: WO2013/105151
PCT Pub. Date: Jul. 18, 2013

(65) Prior Publication Data
US 2013/0308434 A1   Nov. 21, 2013

(30) Foreign Application Priority Data

Jan. 11, 2012   (JP) ................................. 2012-002742

(51) Int. Cl.
G11B 20/18 (2006.01)
G11B 7/12 (2012.01)
G11B 7/004 (2006.01)
G11B 7/085 (2006.01)

(52) U.S. Cl.
CPC .............. *G11B 20/1879* (2013.01); *G11B 7/12* (2013.01); *G11B 7/004* (2013.01); *G11B 7/085* (2013.01)
USPC ...................................... 369/53.44

(58) Field of Classification Search
None
See application file for complete search history.

(56) References Cited

U.S. PATENT DOCUMENTS

| | | | | |
|---|---|---|---|---|
| 4,622,564 A * | 11/1986 | Kaku et al. | ..................... | 347/239 |
| 5,086,419 A * | 2/1992 | Yanagi | ........................ | 369/44.29 |
| 5,126,994 A | 6/1992 | Ogawa et al. | | |
| 5,594,711 A * | 1/1997 | Koyama | ..................... | 369/44.37 |
| 6,215,740 B1 * | 4/2001 | Sasaki | ........................ | 369/44.28 |
| 6,385,147 B1 * | 5/2002 | Olczak | ....................... | 369/44.38 |

(Continued)

FOREIGN PATENT DOCUMENTS

| | | | |
|---|---|---|---|
| JP | 60-133550 A | | 7/1985 |
| JP | 04-034728 A | | 2/1992 |

(Continued)

OTHER PUBLICATIONS

Machine Translation of Nakamura, JP 2007080407 A, Mar. 2007.*

(Continued)

*Primary Examiner* — Peter Vincent Agustin
(74) *Attorney, Agent, or Firm* — Renner, Otto, Boisselle & Sklar, LLP

(57) ABSTRACT

This optical read/write apparatus has first and second optical heads 2a, 2b and includes location control sections 4a, 4b which make the relative arrangement of the first and second optical heads 2a, 2b variable according to either the environmental temperature or from one medium to another. The first optical head 2a performs a write operation to record a mark on an optical storage medium 1, and the second optical head 2b reads the information that has been written by scanning the recorded mark. The apparatus further includes a nonvolatile memory which saves the relative arrangement of the first and second optical heads 2a and 2b either on an environmental temperature basis or on a medium by medium basis.

10 Claims, 16 Drawing Sheets

(56) References Cited

U.S. PATENT DOCUMENTS

| | | | |
|---|---|---|---|
| 2002/0027844 A1* | 3/2002 | Furuhata et al. | 369/44.37 |
| 2008/0205221 A1 | 8/2008 | Kakimoto et al. | |
| 2009/0059739 A1* | 3/2009 | Cas et al. | 369/30.21 |
| 2013/0308434 A1* | 11/2013 | Kitano et al. | 369/53.44 |
| 2014/0003211 A1* | 1/2014 | Hirose et al. | 369/53.36 |

FOREIGN PATENT DOCUMENTS

| | | |
|---|---|---|
| JP | 08-227527 A | 9/1996 |
| JP | 2004-192671 A | 7/2004 |
| JP | 2006-012343 A | 1/2006 |
| JP | 2007-080407 A | 3/2007 |
| JP | 2008-165863 A | 7/2008 |

OTHER PUBLICATIONS

International Search Report for corresponding International Application No. PCT/JP2012/004623 mailed Aug. 14, 2012.

Form PCT/ISA/237 for corresponding International Application No. PCT/JP2012/004623 dated Aug. 14, 2012 and partial English translation.

* cited by examiner

OPTICAL READ/WRITE APPARATUS

TECHNICAL FIELD

The present disclosure relates to an optical read/write apparatus which reads, writes or erases information stored or to be stored from/on an optical storage medium, and more particularly relates to an optical read/write apparatus which performs a verify operation while writing data.

BACKGROUND ART

Nowadays, so-called "crowd computing" technologies are provided to allow people to use various kinds of services via servers and storage systems on some network. According to such crowd computing technologies, as a lot of users save various kinds of data on that storage system on the network, the amount of data accumulated there should keep on skyrocketing from now on. Meanwhile, to preserve such a huge amount of data saved, it should also be increasingly important to devise a method for saving that enormous amount of data as securely and as reliably as possible. And as such a huge amount of data should now be saved on the network with as much reliability as possible, an optical read/write apparatus to be used as such a storage system is required to verify the data that the apparatus is writing.

An optical read/write apparatus which performs a write operation and a verify operation using one, two or more optical heads (or optical pickups) is disclosed in Patent Document No. 1, for example. A technique for performing a write operation and a read operation for verification purposes in parallel is called a "DRAW (direct read after write)" technique.

According to the conventional verification method, when data that has been written on a storage medium is read in a predetermined unit, the decision is made whether the frequency of errors that have occurred in the data yet to be subjected to "error correction" is equal to or greater than a predetermined reference value or not. If a mark that has been recorded on a storage medium has an inappropriate shape, a read error will occur. If the frequency of occurrence of such read errors is sufficiently low, the data represented by those recorded marks can still be restored by error correction and can be read as intended. However, if the frequency of occurrence of such read errors is too high, the data cannot be restored and read properly even when subjected to the error correction. Thus, if the frequency of occurrence of read errors during a verify operation is equal to or greater than a reference value, the decision is made that that data should be rewritten.

CITATION LIST

Patent Literature

Patent Document No. 1: Japanese Laid-Open Patent Publication No. 2007-80407

SUMMARY OF INVENTION

Technical Problem

The present disclosure provides an optical read/write apparatus that can get a verify operation done in a shorter time after a write operation has been started.

Solution to Problem

An optical read/write apparatus according to the present disclosure has first and second optical heads and includes a control section which controls the positions of the first and second optical heads so that the relative arrangement of the first and second optical heads is changeable. The first optical head writes data on an optical storage medium by recording a mark on the optical storage medium, and the second optical head reads the mark that has been recorded on the optical storage medium.

Advantageous Effects of Invention

An optical read/write apparatus according to the present disclosure can get a verify operation done in a shorter time after a write operation has been started.

BRIEF DESCRIPTION OF DRAWINGS

FIG. 16 Illustrates the relative arrangement of respective optical heads 2a, 2b, 2b' and 2b" with respect to tracks on the optical disc 100 in a situation where the optical heads 2b, 2b' and 2b" are located at the same physical distance from the optical head 2a.

DESCRIPTION OF EMBODIMENTS

Figure 1:
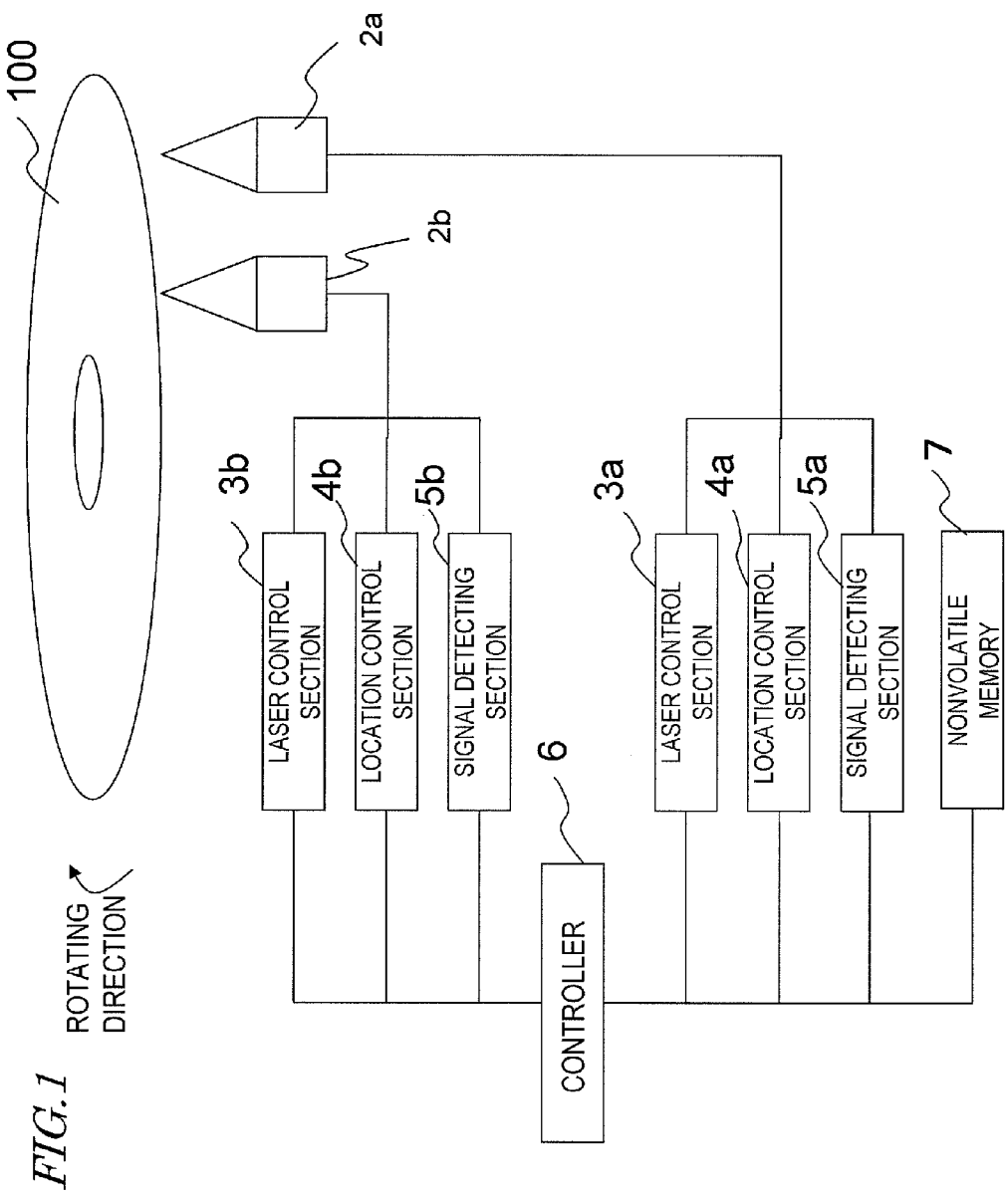
FIG. 1 Illustrates a configuration for an optical read/write apparatus according to a first embodiment.

Data stored on an optical storage medium such as an optical disc or an optical tape can be read by irradiating the optical storage medium rotating or running with a relatively weak light beam with a constant intensity and by detecting the light that has been reflected from the optical storage medium. On a read-only optical disc, for example, information is already stored as pits that are arranged spirally during the manufacturing process of the optical disc. On the other hand, on a rewritable optical disc, a recording material film, from/on which data can be read and written optically, is deposited by evaporation process, for example, on the surface of a base member on which tracks with spiral lands or grooves are arranged. In writing data on a rewritable optical disc, data is written there by irradiating the optical disc with a light beam, of which the optical power has been changed according to the data to be written, and locally changing the properties (including the refractive index and reflectance) of the recording material film.

When data is going to be written on the recording material film, the recording material film is irradiated with such a light beam, of which the optical power has been modulated as described above, thereby recording an amorphous mark on a crystalline recording material film. Such an amorphous recorded mark is left there by heating a portion of the recording material film that has been irradiated with a write light beam to a temperature that is equal to or higher than its melting point and then rapidly cooling that portion. If the optical power of a light beam that irradiates the recorded mark is set to be relatively low, the temperature of the recorded mark being irradiated with the light beam does not exceed its melting point and the recorded mark will turn crystalline again after having been cooled rapidly (i.e., the recorded mark will be erased). In this manner, the recorded mark can be rewritten over and over again. However, if the power of the light beam for writing data had an inappropriate level, then the recorded mark would have a deformed shape and sometimes it could be difficult to read the data as intended.

To read or write data from/on an optical storage medium, the light beam needs to maintain a predetermined converging state on a target track. For that purpose, a "focus control" and a "tracking control" need to be performed. The "focus control" means controlling the position of an objective lens perpendicularly to the surface of the optical storage medium so that the focal point (or at least the converging point) of the light beam is always located on the target track. On the other hand, the "tracking control" means controlling the position of the objective lens parallel to the surface of the optical storage medium and perpendicularly to the track so that the light beam spot is located right on the target track.

In order to perform such a focus control or a tracking control, the focus error or the tracking error needs to be detected based on the light that has been reflected from the optical storage medium and the position of the light beam spot needs to be adjusted so as to reduce the error as much as possible. The magnitudes of the focus error and the tracking error are respectively represented by a "focus error (FE) signal" and a "tracking error (TE) signal", both of which are generated based on the light that has been reflected from the optical storage medium.

It should be noted that the depth of the pits and tracks and the thickness of the recording material film are both smaller than the thickness of the base member of the optical storage medium. For that reason, those portions of the optical storage medium, where data is stored, define a two-dimensional plane, which is sometimes called a "storage plane" or an "information plane".

The optical storage medium includes at least one such information layer. Actually, however, a single information layer may include multiple layers such as a phase change material layer and a reflective layer.

To read data from an optical storage medium and/or to write data on the optical storage medium, an optical read/write apparatus with an optical head is used. The optical head includes a light source which emits a light beam, an objective lens which makes the light beam that has been emitted from the light source converge onto the optical storage medium, and a photodetector which measures the intensity of the light reflected from the optical storage medium being irradiated with the light beam.

After the recording material film has been irradiated with light to record a mark on it, the optical properties (including the refractive index and reflectance), shape and size of the recorded mark on the recording material film will change with time. As described above, its optical properties change while the recording material film that has been heated to a high temperature by being irradiated with the light gets cooled naturally. The amount of time it takes for all of these changes to settle and for the recorded mark to get stabilized varies according to the type of the optical storage medium, and may be longer than a few seconds in some cases. As long as the recorded mark is not stabilized, even if a verify operation was performed, the expected result would not be obtained.

To perform a verify operation after an amount of time for a mark recorded to get stabilized sufficiently has passed, the distance between an optical head for reading and an optical head for writing may be set so that the optical head for reading does not start a read operation until plenty of time has passed since the optical head for writing irradiated the mark with light.

Figure 15:
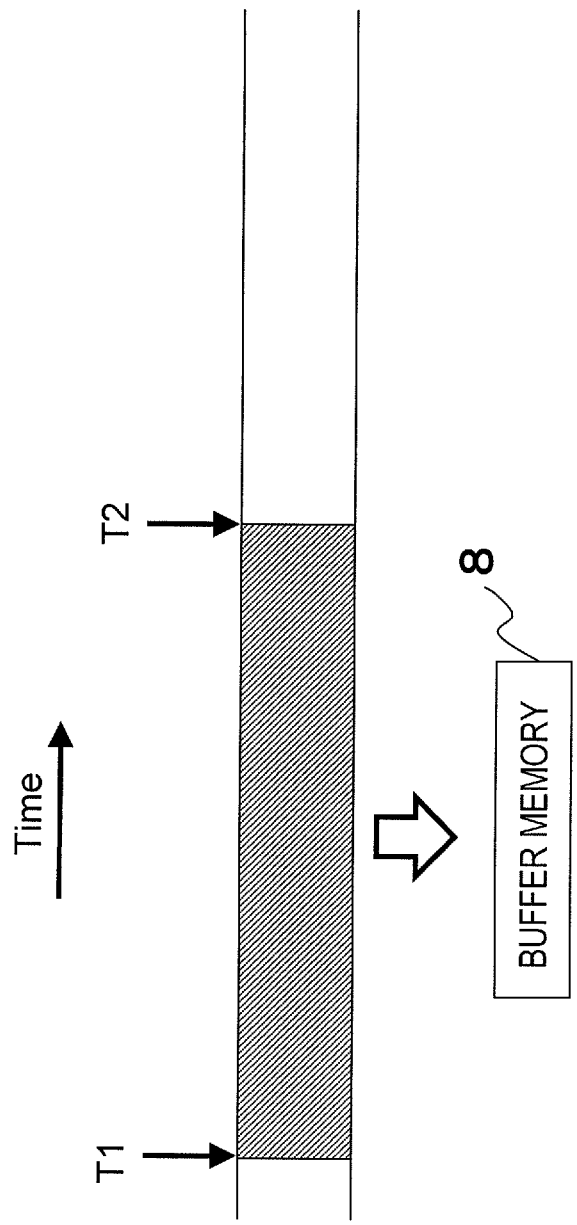
FIG. 15 Illustrates a buffer memory 8 and the quantity of data to be stored in the buffer memory 8.

However, the longer the distance between those optical heads for writing and reading, the larger the size of data to be written on the optical storage medium since the write operation ended and until the read operation for verification purposes is started. Depending on the result of the verify operation, such data should be rewritten on the optical storage medium. For that reason, the optical read/write apparatus includes a buffer memory 8 as shown in FIG. 15 and is required to temporarily retain the data in that buffer memory 8 until the verify operation gets done. FIG. 15 schematically illustrates the quantity of the data to be written on the optical storage medium in the period that begins with the time T1 when a mark starts to be recorded and ends with the time T2 when the verify operation is performed. If the period from the mark recording start time T1 through the verification time T2 was long, the quantity of data to be retained in the buffer memory 8 could be enormous.

In some storage media, it could take as long as a few seconds to get the recorded mark stabilized. If such an optical storage medium might be used, the period from the mark recording start time T1 through the verification time T2 should always be set to be long irrespective of the type of the optical storage medium loaded. In that case, however, even if the recorded mark could actually be stabilized in a short time on the optical storage medium loaded, a lot of data would be retained in the buffer memory 8 in vain and it would take a long time to get ready for the verify operation. In addition, in a situation where the period from the mark recording start time T1 through the verification time T2 is long, even if data has been written under an inappropriate condition (e.g., in terms of the power of the write light beam), the write operation could be continued without modifying the writing condition for a long time. If the data writing condition (e.g., the power of the write light beam) were fixed, the quality of the recorded mark could be debased while user data is being written on the optical storage medium. For example, the power of the write light beam could have different optimum values between a location close to the center of an optical disc and a location close to the periphery of the optical disc. That is why if data continued to be written for a long time with the power of the write light beam set to be constant, the recorded mark could deteriorate in the course of that long write operation. However, if the period from the mark recording start time T1 through the verification time T2 was long, it would take a longer time to detect such deterioration of the recorded mark, which is a problem.

According to an embodiment of the present disclosure, the inconveniences described above can be avoided by changing the relative arrangement of multiple optical heads.

An optical read/write apparatus according to the present disclosure has first and second optical heads and includes a control section which controls the positions of the first and second optical heads so that the relative arrangement of the first and second optical heads is changeable. The first optical head writes data on an optical storage medium by recording a mark on the optical storage medium, and the second optical head reads the mark that has been recorded on the optical storage medium.

In one embodiment, the control section changes the relative arrangement of the first and second optical heads so that an interval between a start of recording the mark on the optical storage medium by the first optical head and a readout of the recorded mark by the second optical head is changed according to an environmental temperature or the type of the optical storage medium.

In one embodiment, the data to be written by the first optical head on the optical storage medium includes a signal to be used to perform a verify operation.

In one embodiment, the apparatus includes a memory that stores information defining the relative arrangement of the first and second optical heads.

In one embodiment, the information defining the relative arrangement is information that indicates correspondence between the relative arrangement, the environmental temperature and the type of the optical storage medium.

In one embodiment, the control section determines the relative arrangement of the first and second optical heads by the index value of a detection signal to be obtained by getting the recorded mark on the optical storage medium read by the second optical head.

In one embodiment, the index value of the detection signal includes a jitter value, an asymmetry value, a β value, and the degree of modulation, and the control section determines the relative arrangement of the first and second optical heads so that the index value reaches a preset value.

In one embodiment, the control section changes the relative arrangement of the first and second optical heads according to the index value of the detection signal after user data has started to be written.

In one embodiment, the control section determines the relative arrangement of the first and second optical heads before user data starts to be written.

In one embodiment, the optical read/write apparatus includes another optical head.

In one embodiment, the control section has a mechanism that moves the first and second heads independently of each other.

Hereinafter, embodiments will be described in detail with reference to the accompanying drawings as needed. It should be noted that the description thereof will be sometimes omitted unless it is absolutely necessary to go into details. For example, description of a matter that is already well known in the related art will be sometimes omitted, so will be a redundant description of substantially the same configuration. This is done solely for the purpose of avoiding redundancies and making the following description of embodiments as easily understandable for those skilled in the art as possible.

It should be noted that the present inventors provide the accompanying drawings and the following description to help those skilled in the art understand the present disclosure fully. And it is not intended that the subject matter defined by the appended claims is limited by those drawings or the description.

Embodiment 1

Hereinafter, an optical read/write apparatus as a first embodiment will be described. In the following description, the optical storage medium is supposed to be an optical disc.

<1-1. Configuration>

FIG. 1 illustrates a configuration for an optical read/write apparatus according to an embodiment. As shown in FIG. 1, the optical read/write apparatus of this embodiment includes two optical heads 2a and 2b for optically accessing an optical disc 100. The optical head 2a may be used for writing and the optical head 2b may be used for reading. Just like a known optical head, each of these optical heads 2a and 2b includes a light source which emits a light beam, an objective lens which converges the light beam that has been emitted from the light source onto an optical storage medium, and a photodetector which measures the intensity of the light that has been reflected from the optical storage medium being irradiated with the light beam. If these two optical heads 2a and 2b have the same configuration, any one of the two may be used for writing and the other for reading. Optionally, some of multiple optical heads may be used as a read-only one. In that case, the read-only optical head does not need a high-power light source which can produce a light beam with power that is high enough to write data.

In this description, the terms "for writing" and "for reading" are used with respect to a DRAW (direct read after write) operation to be carried out in a "write mode". In a "read mode" in which the user data that has already been written on an optical storage medium is read, the DRAW operation is not performed. That is why in the "read mode", arbitrary one(s), or even all, of the multiple optical heads may be used for reading.

In this embodiment, the optical heads 2a and 2b may move independently of each other in either or both of the "track direction" and "track crossing direction" on an optical storage medium (e.g., the optical disc 100). Specifically, these optical heads 2a and 2b are supported by a head moving mechanism that can change the positions of the optical heads 2a and 2b independently of each other. Such a head moving mechanism may be implemented as an optical head traverse unit adopted in a known optical disc drive, for example. The optical head traverse unit can move an optical head in a radial direction on an optical disc using a motor. If those two optical heads 2a and 2b are mounted on the two moving portions of a traverse unit, the positions of the heads 2a and 2b in the radial direction on the optical disc can be changed independently of each other.

An optical read/write apparatus according to this embodiment includes two laser control sections 3a and 3b, two location control sections 4a and 4b and two signal detecting sections 5a and 5b which respectively perform a laser control, a position control and signal detection on the optical heads 2a and 2b independently of each other. The optical read/write apparatus further includes a controller 6 which controls these laser control sections 3a, 3b, location control sections 4a, 4b and signal detecting sections 5a, 5b. The controller 6 can determine the best relative arrangement of the write optical head 2a and the read optical head 2b. The optical read/write apparatus of this embodiment further includes a nonvolatile memory 7 which stores information to determine the relative arrangement of the write and read optical heads 2a and 2b.

Figure 2:
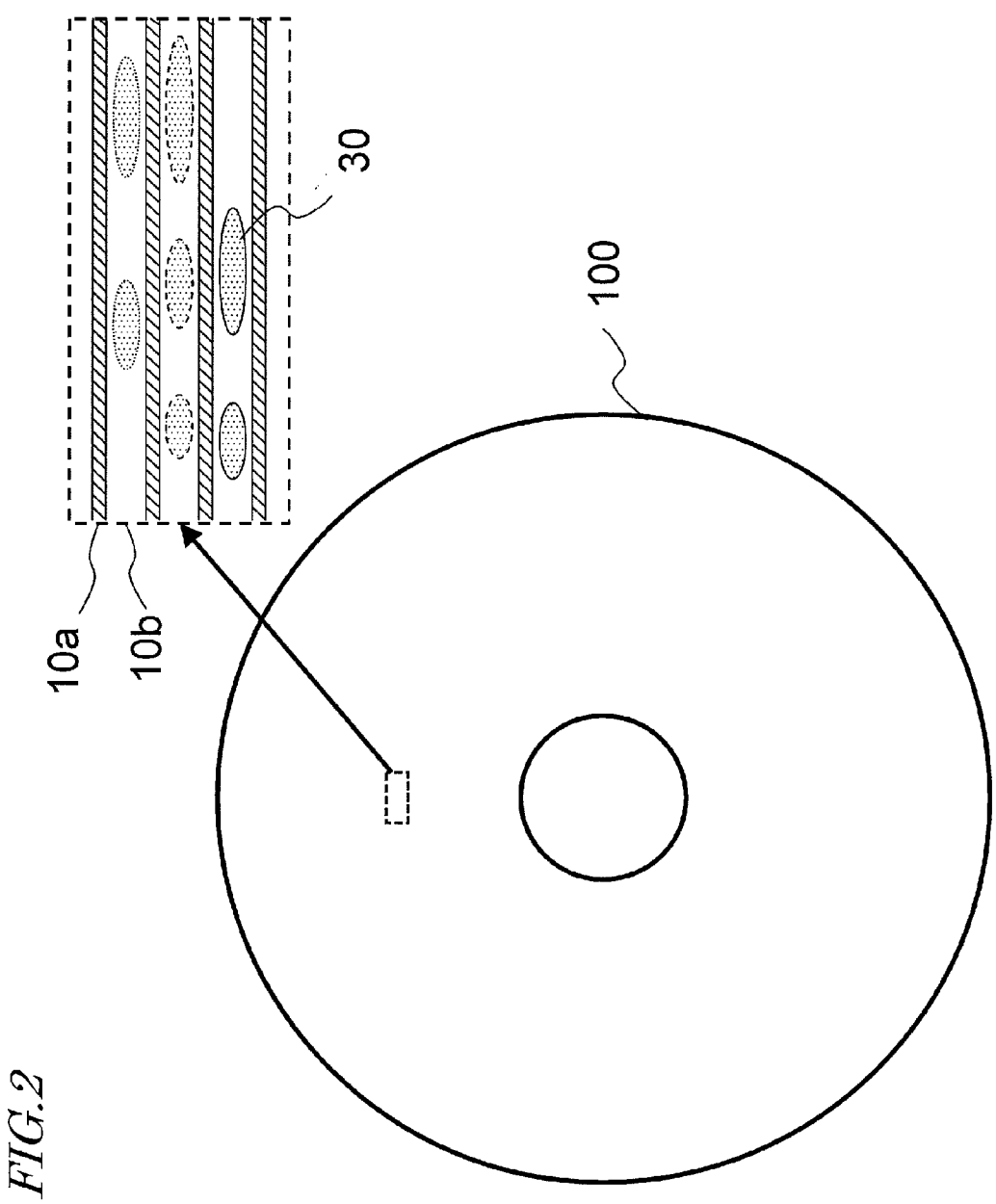
FIG. 2 Schematically illustrates the optical disc 100 and its portion (surrounded with a dashed line) on a larger scale.

FIG. 2 schematically illustrates the optical disc 100 and its portion (surrounded with a dashed line) on a larger scale. The optical disc 100 has spiral or concentric tracks. On the optical disc 100 shown in FIG. 2, arranged are lands 10a and grooves 10b, and data is written on the grooves 10b. Also illustrated schematically in FIG. 2 are marks 30 that have been recorded on the optical disc 100.

Figure 3:
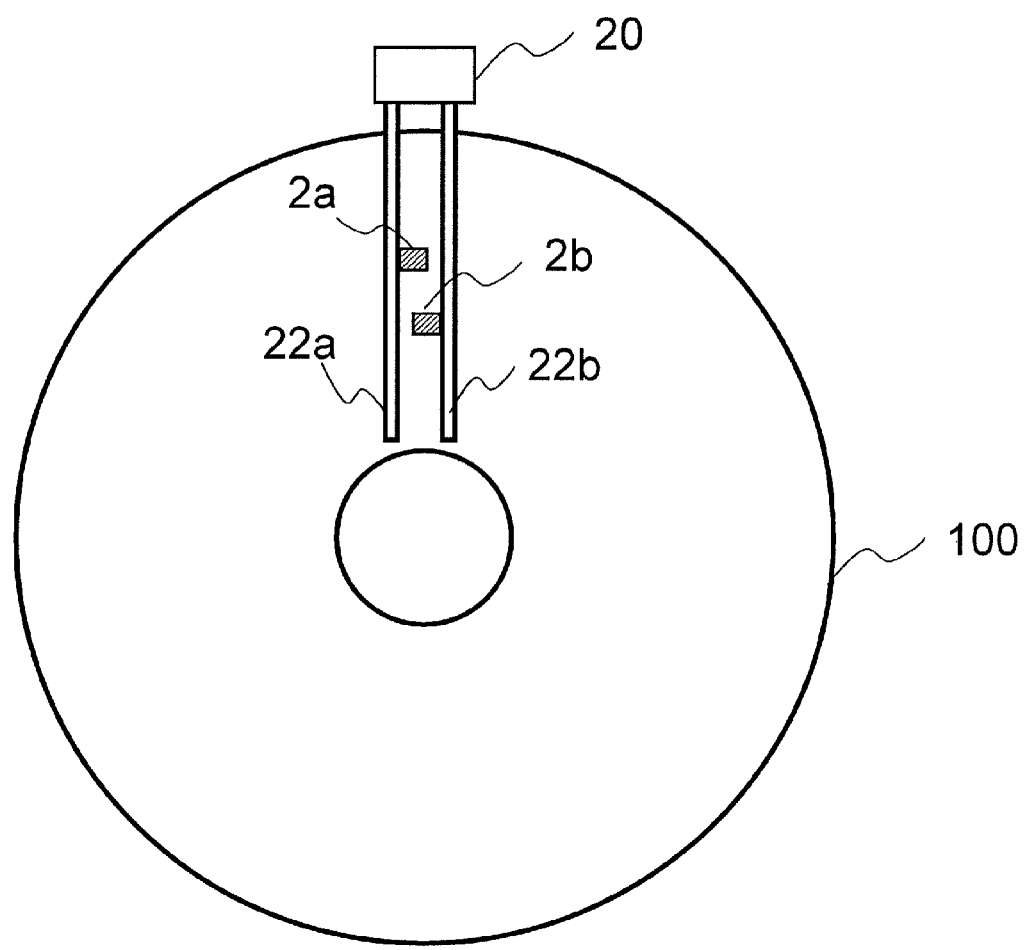
FIG. 3 Illustrates an example of a traverse unit 20.

FIG. 3 illustrates an example of a traverse unit 20 which can move the two optical heads 2a and 2b independently of each other. Specifically, the optical head 2a is driven along the guide 22a of the traverse unit 20 to move in the radial direction on the optical disc 100. On the other hand, the optical head 2b is driven along the guide 22b of the traverse unit 20 to move in the radial direction on the optical disc 100.

Figure 4:
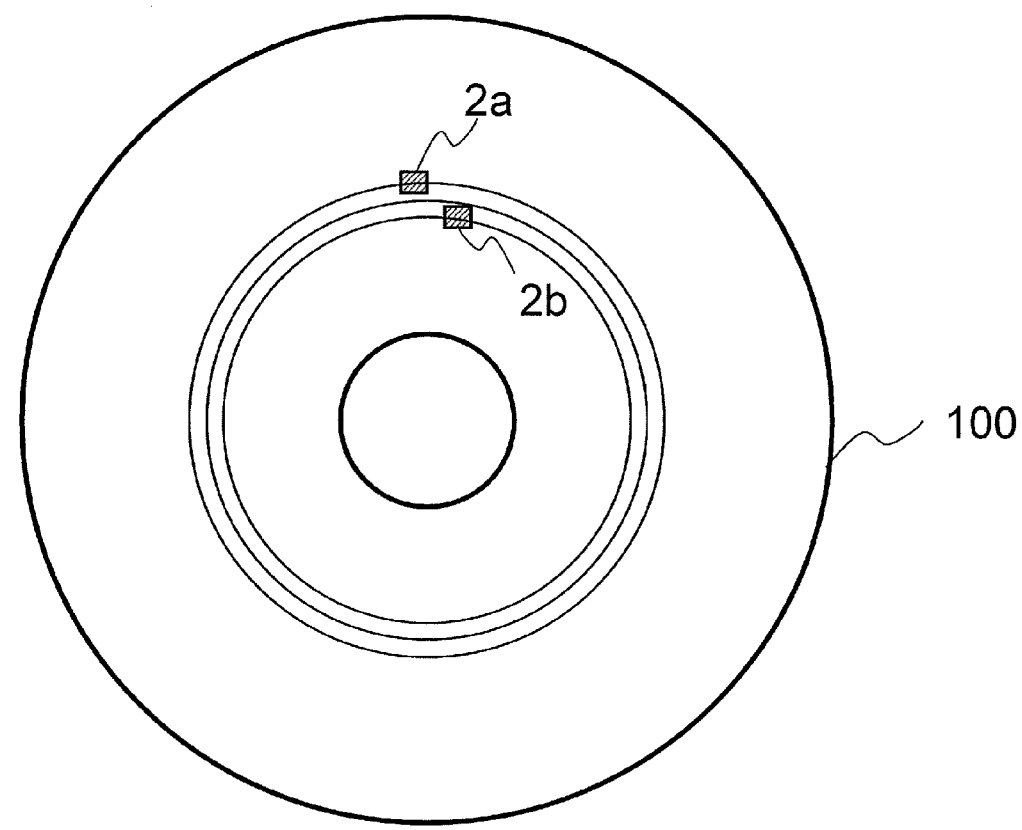
FIG. 4 Illustrates the relative arrangement of optical heads 2a and 2b with respect to tracks on the optical disc 100.

FIG. 4 illustrates the relative arrangement of the optical heads 2a and 2b with respect to tracks on the optical disc 100 with illustration of the traverse unit 20 omitted. In the example illustrated in FIG. 4, the optical head 2a is located closer to the outer edge of the optical disc 100 than the optical head 2b is. In other words, the track irradiated with the write light beam by the optical head 2a is located outside of the track irradiated with the read light beam by the optical head 2b. In this example, the optical head 2a begins to write data on the optical disc 100 with its innermost track. And as the optical disc 100 rotates, the optical head 2a moves outward to scan the tracks one by one, thereby changing target tracks to write data on one after another from the innermost track toward the outermost one. Meanwhile, the optical head 2b scans the track on which data has just been written by the optical head 2a shortly after the optical head 2a left. In the example illustrated in FIG. 4, the optical head 2b is located two tracks inside of the optical head 2a. In other words, the optical head 2b is scanning this optical disc 100 two turns behind the optical head 2a.

Figure 5:
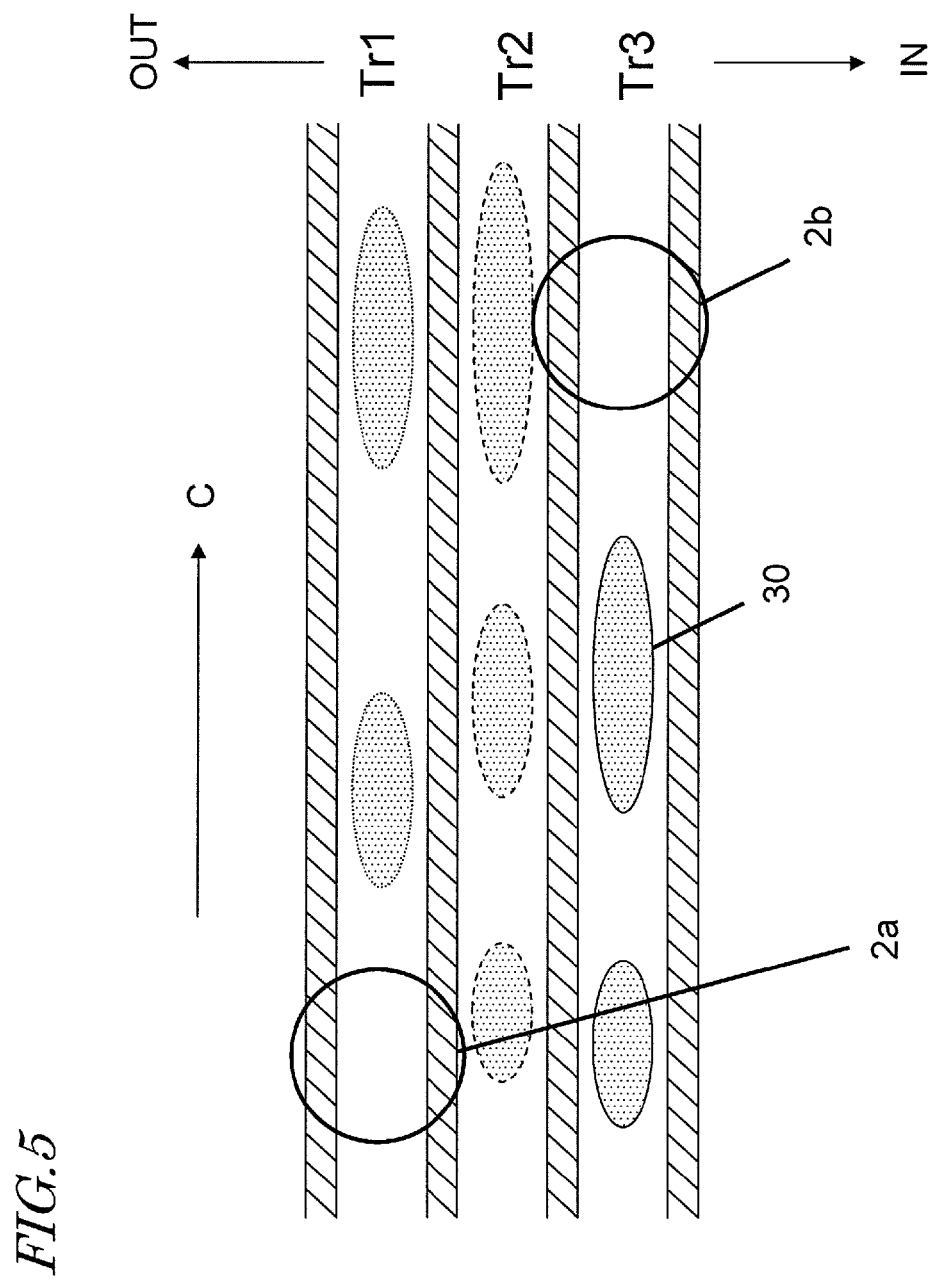
FIG. 5 Illustrates an exemplary relative arrangement of the optical heads 2a and 2b on a larger scale.

FIG. 5 illustrates an exemplary relative arrangement of the optical heads 2a and 2b on a larger scale. In the example illustrated in FIG. 5, the optical head 2a is currently located on the outer track Tr1 (as indicated by "OUT"), while the optical head 2b is currently located on the inner track Tr3 (as indicated by "IN"). The optical disc is rotating in the direction indicated by the arrow C. When the optical disc 100 turns once, the optical head 2b will change tracks to the next one Tr2. And when the optical disc 100 turns once more, the optical head 2b will change tracks to the next one Tr1.

Figure 6:
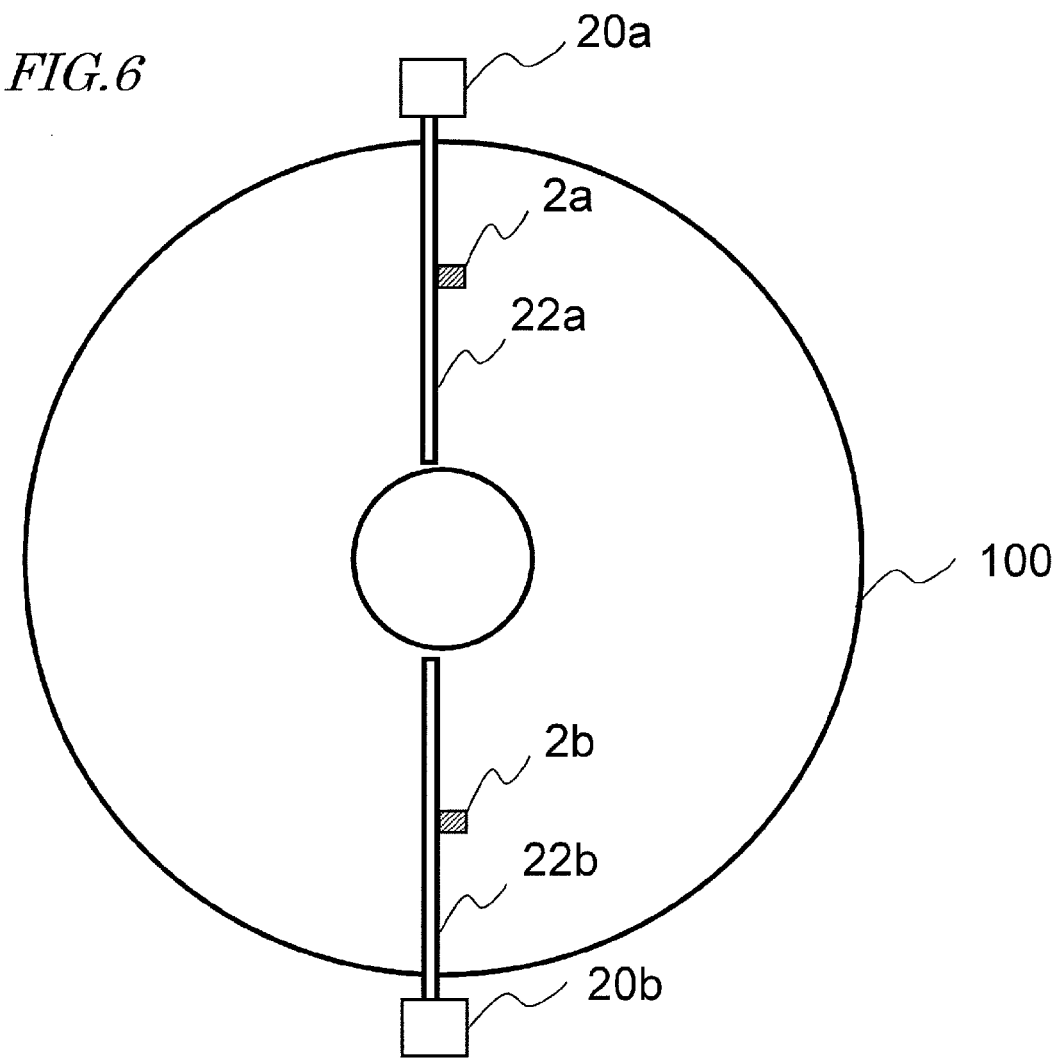
FIG. 6 Illustrates another example of traverse units.

FIG. 6 illustrates another example of traverse units which can also move the two optical heads 2a and 2b independently of each other. In this example, two traverse units 20a and 20b are arranged separately from each other so as to define an angle of 180 degrees with respect to the center of rotation of the optical disc 100. The optical head 2a is driven along the guide 22a of the traverse unit 20a to move in the radial direction on the optical disc 100. On the other hand, the optical head 2b is driven along the guide 22b of the traverse unit 20b to move in the radial direction on the optical disc 100.

Figure 7:
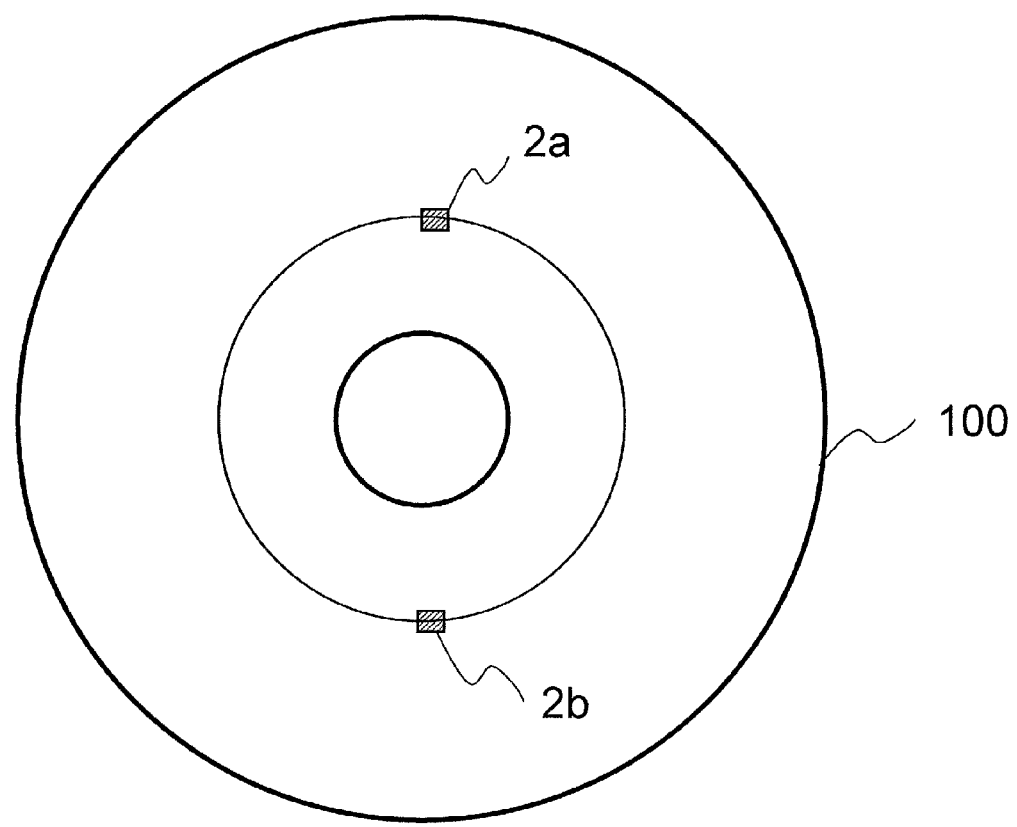
FIG. 7 Illustrates an exemplary relative arrangement of the optical heads 2a and 2b with respect to tracks on the optical disc 100.

FIG. 7 illustrates an exemplary relative arrangement of the optical heads 2a and 2b with respect to tracks on the optical disc 100 with illustration of the traverse units 20a and 20b omitted. In the example illustrated in FIG. 7, the optical heads 2a and 2b are currently located on the same track on the optical disc 100. The optical head 2b scans the track on which data has just been written by the optical head 2a a half round after the optical head 2a left.

Figure 8:
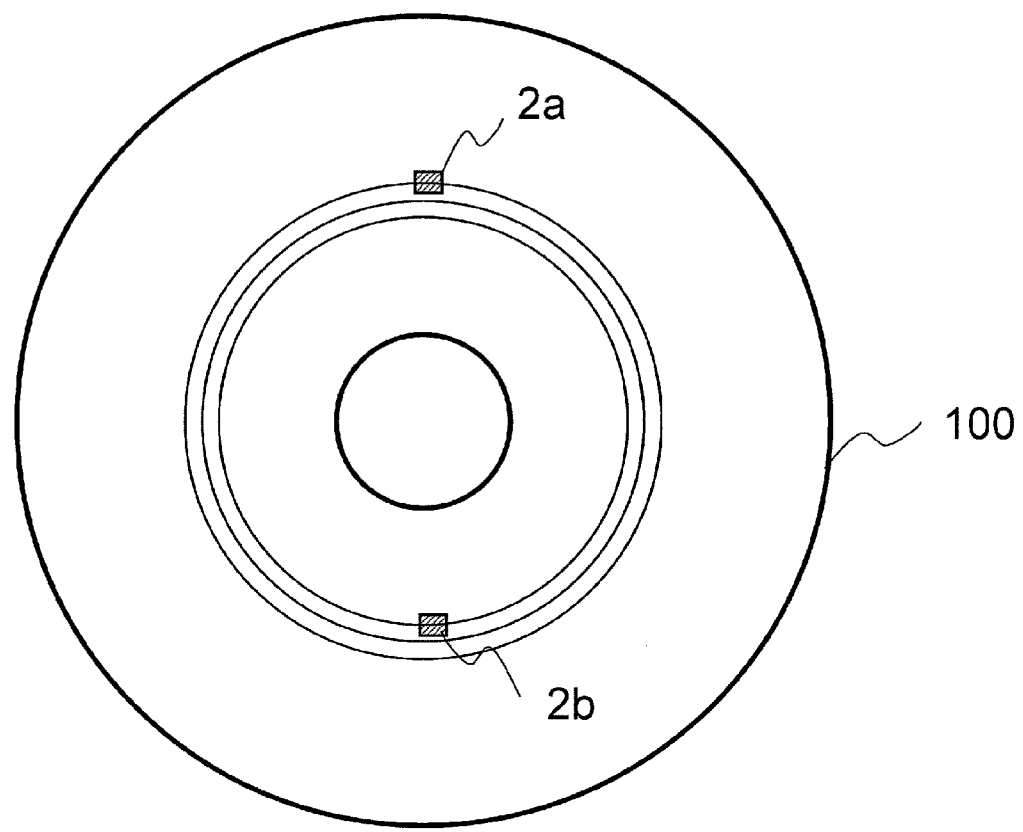
FIG. 8 Illustrates another exemplary relative arrangement of the optical heads 2a and 2b with respect to tracks on the optical disc 100.

FIG. 8 illustrates another exemplary relative arrangement of the optical heads 2a and 2b with respect to tracks on the optical disc 100. In this example, the optical head 2b is located two tracks inside of the optical head 2a. In other words, the optical head 2b is scanning this optical disc 100 two and a half turns behind the optical head 2a.

In the exemplary relative arrangement shown in FIG. 4, the optical head 2a is moving ahead of the optical head 2b by an angle of approximately 720 degrees (=approximately 2×360 degrees) with respect to the center of rotation of the optical disc 100. In the exemplary relative arrangement shown in FIG. 7, the optical head 2a is moving ahead of the optical head 2b by an angle of 180 degrees. And in the exemplary relative arrangement shown in FIG. 8, the optical head 2a is moving ahead of the optical head 2b by an angle of approximately 900 degrees (=approximately 2.5×360 degrees). However, the optical head 2a moving ahead of the optical head 2b may define any arbitrary angle. In other words, the angle defined by the respective guides 22a and 22b of the two traverse units 20a and 20b shown in FIG. 6 does not have to be 0 or 180 degrees but may also be any other value.

Figure 16:
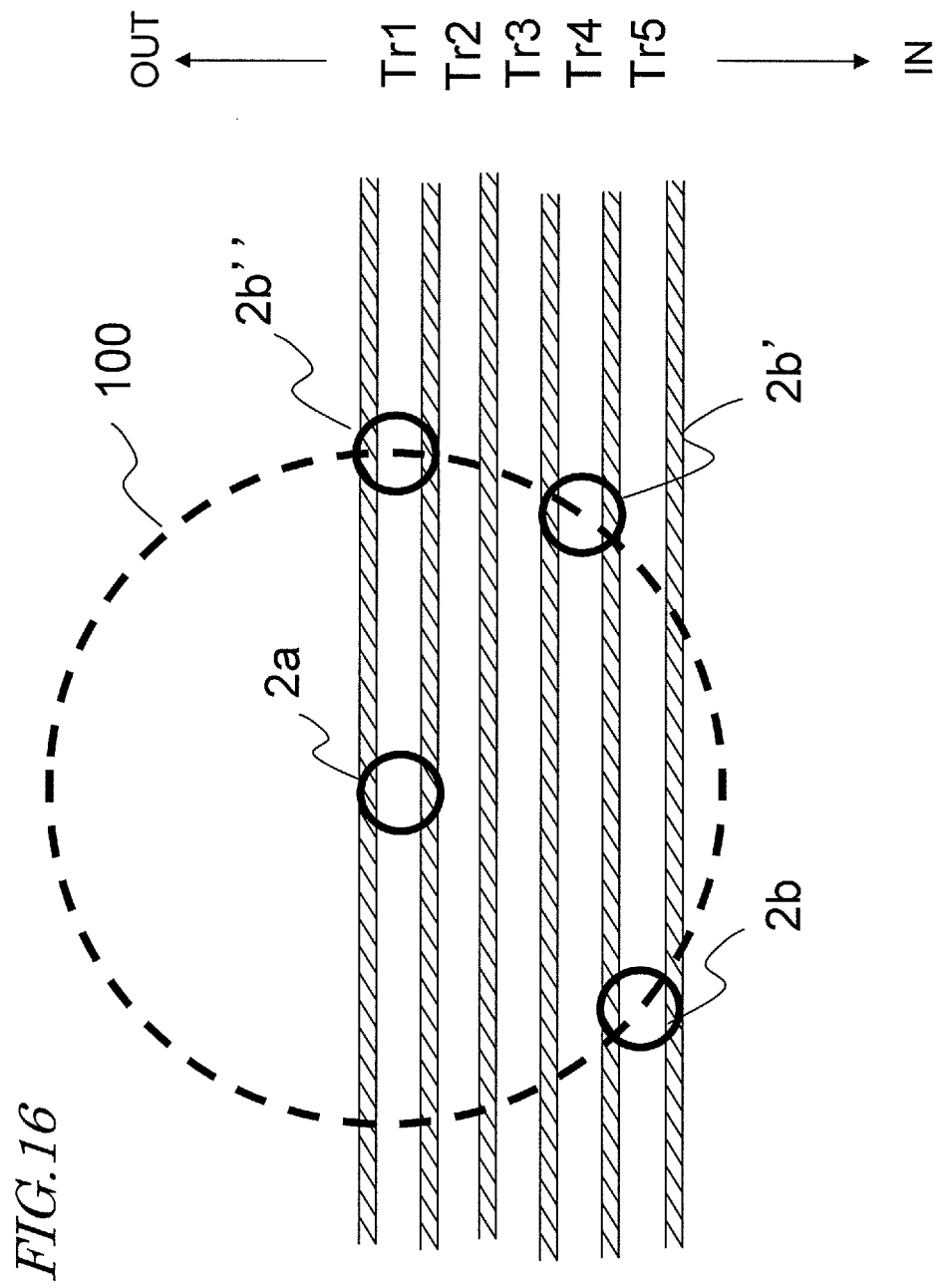

In this description, the "distance" between two heads refers herein to the distance as measured along tracks on an optical storage medium. In other words, the "distance" means the distance over which the light beam spot left by write optical head 2a has traveled on the optical disc since a mark started to be recorded by the write optical head 2a and until that recorded mark is read by the read optical head 2b. This "distance" changes if the relative arrangement of the write and read optical heads 2a and 2b is changed. For example, supposing the read optical head 2b is arranged behind the write optical head 2a so as to be located on the circumference of a circle drawn around the write optical head 2a as shown in FIG. 16, even if the physical distance is the same between the heads 2a and 2b, between the heads 2a and 2b' and between the heads 2a and 2b", the head-to-head distances are different. That is to say, even if the physical distance between the write optical head 2a and the read optical head 2b is constant, the head-to-head distance can also be changed just by changing their relative arrangement.

Next, an exemplary circuit configuration for an optical read/write apparatus according to this embodiment will be described with reference to FIG. 9.

Figure 9:
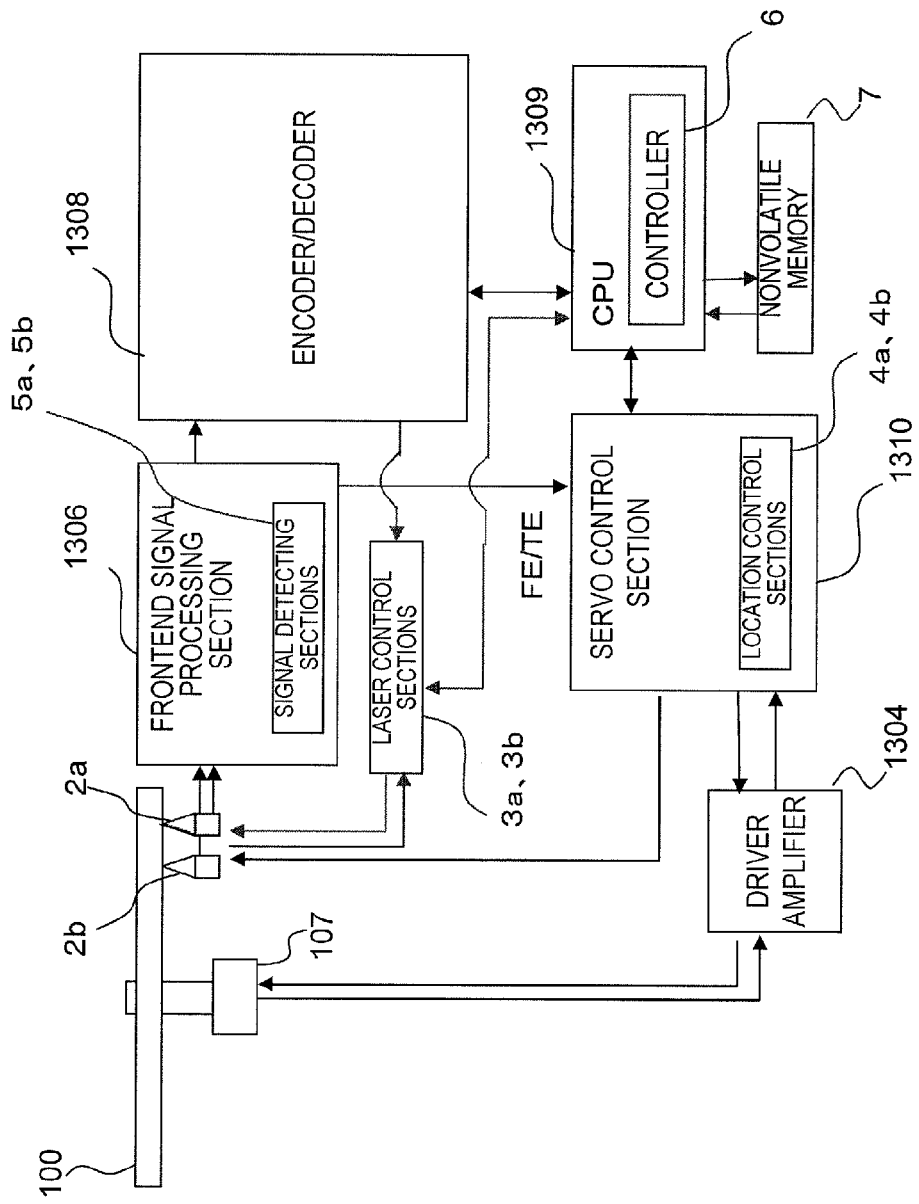
FIG. 9 Illustrates an exemplary circuit configuration for an optical read/write apparatus according to this embodiment.

In the exemplary configuration shown in FIG. 9, the outputs of the optical heads 2a and 2b are supplied to an encoder/decoder 1308 by way of a frontend signal processing section 1306. In the read mode, the encoder/decoder 1308 decodes the data that is stored on the optical disc 100 based on the signals that have been generated by the optical heads 2a and 2b. In the write mode, on the other hand, the encoder/decoder 1308 encodes the data to generate a signal to be written on the optical disc 100 and outputs the signal to the laser control sections 3a and 3b. In response, the laser control sections 3a and 3b detect the powers of the optical heads 2a and 2b, respectively, and control the powers toward target powers. Furthermore, in the write mode, the laser control sections 3a and 3b control the laser powers of the optical heads 2a and 2b based on the output of the encoder/decoder 1308.

The frontend signal processing section 1306 not only generates read signals based on the outputs of the optical heads 2a and 2b but also generates a focus error signal FE and a tracking error signal TE. The focus error signal FE and the tracking error signal TE are then supplied to the servo control section 1310. In response, the servo control section 1310 gets the motor 107 controlled by a driver amplifier 1304. The servo control section 1310 also gets the positions of objective lenses controlled by respective lens actuators in the optical heads 2a and 2b. Although not shown, the servo control section 1310 also controls the positions of the respective traverse units of the optical heads 2a and 2b. The encoder/decoder 1308, the servo control section 1310, the laser control sections 3a and 3b and all the other components are controlled by a CPU 1309.

The function of the location control sections 4a and 4b shown in FIG. 1 is performed by the servo control section 1310. The function of the signal detecting sections 5a and 5b is performed by the frontend signal processing section 1306. And the function of the controller 6 is performed by the CPU 1309.

<1-2. Operation>

Hereinafter, it will be described how the optical read/write apparatus with such a configuration operates. More specifically, it will be described how a recorded mark that has been left by the optical head 2a for writing is scanned by the optical head 2b for reading to get a verify operation done using this optical read/write apparatus.

First of all, Procedure 1 will be described. As Procedure 1, this optical read/write apparatus performs the following preprocessing (learning by test write operation) before starting the write operation. For example, this optical read/write apparatus makes the write optical head 2a record a mark on the optical disc 100 and then makes the signal detecting section 5b shown in FIG. 1 detect the level of the detection signal with respect to the signal that has been read by the read optical head 2b from the recorded mark. In this case, the relative arrangement in which the read optical head 2b is located behind the write optical head 2a may be changed by the location control section 4b, thereby setting the distance between the write and read optical heads 2a and 2b to be various different values and making the signal detecting section 5b measure the level of the detection signal with respect to the output signal of the read optical head 2b. In this manner, the index value level of the detection signal to be detected from the recorded mark can be measured with respect to the time passed.

Figure 10:
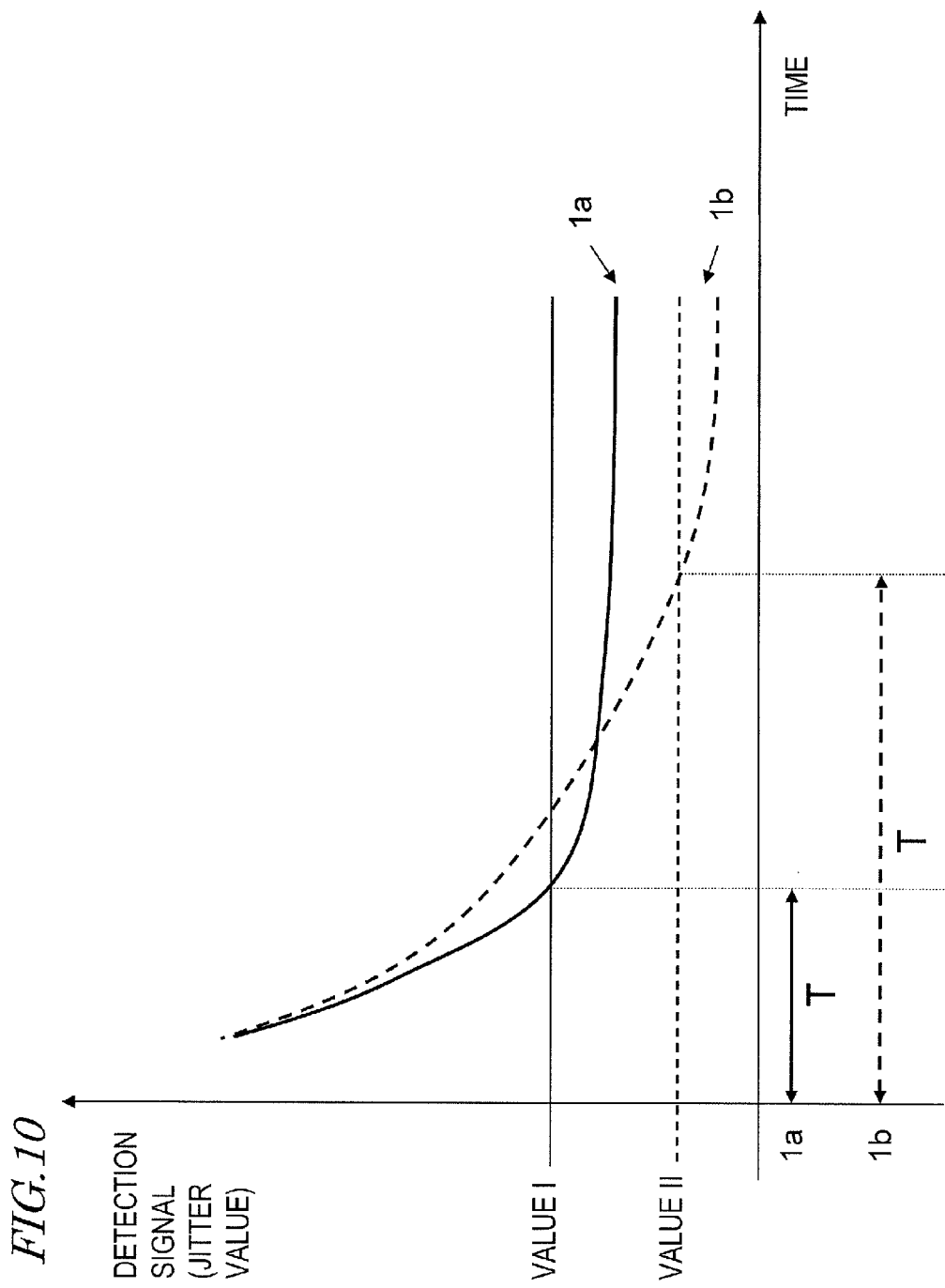
FIG. 10 A characteristic diagram showing how a detection signal (representing a jitter value) for use to make a verify decision changes with time.

FIG. 10 shows how the characteristics may change with time in a situation where the index value of the detection signal that has been obtained as a result of the measurement is a jitter value. In FIG. 10, the solid curve indicates how the jitter value of a medium 1a changes with time, while the dotted curve indicates how the jitter value of a medium 1a changes with time. These media 1a and 1b are rewritable optical discs with which the optical read/write apparatus of this embodiment may be loaded.

In FIG. 10, the jitter value of the medium 1a will be a predetermined value I after a certain period of time passes. Likewise, the jitter value of the medium 1b will be a predetermined value II after another certain period of time passes. The recorded mark unstable period T of the medium 1a is the period of time it takes for the jitter value to become the predetermined value I. And when the recorded mark unstable period is over, a recorded mark stabilized period will start at that point in time. In the same way, the recorded mark unstable period T of the medium 1b is the period of time it takes for the jitter value to become the predetermined value II. And when the recorded mark unstable period is over, a recorded mark stabilized period will start at that point in time.

The period of time it takes for a recorded mark to get stabilized is as long as the period of time T it takes for a jitter value to become the predetermined value. As shown in FIG. 10, the period of time T it takes for a recorded mark to get stabilized varies from medium to another. In addition, the period of time T it takes for a recorded mark to get stabilized also varies according to the environmental temperature as well.

Figure 11:
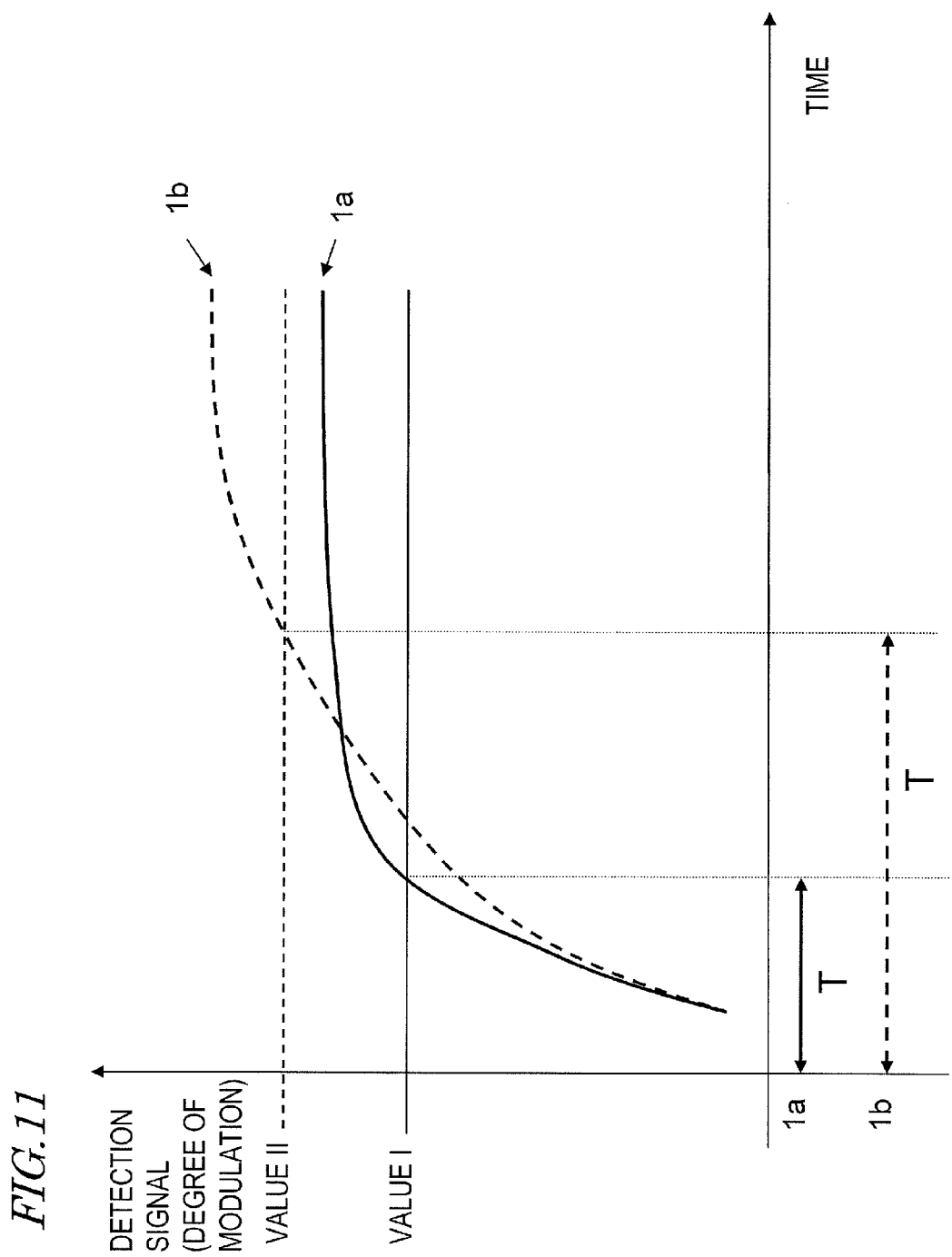
FIG. 11 A characteristic diagram showing how a detection signal (representing the degree of modulation) for use to make a verify decision changes with time.

Although the detection signal index value is supposed to be a jitter value in the example shown in FIG. 10, any other index value such as an asymmetry value, a β value, or the degree of modulation may also be used. Each of those detection signal index values varies not only with time but also according to the type of the given medium or the environmental temperature as well. For example, if the degree of modulation is used as a detection signal index value, its variation with time is shown in FIG. 11. Also, if the error rate after the recovery turns out to be equal to or smaller than a reference value (which may be 0.02, for example), the decision can be made that the verify operation is ready to be performed (such a state will be referred to herein as "verify OK state").

In this embodiment, first of all, a threshold value representing the level of a detection signal index value indicating that verify OK state in which the recorded mark gets stabilized is determined either on an environmental temperature basis or on a medium by medium basis. Such a threshold value will be referred to herein as "threshold value I" or "threshold value II". Also, the distance between the write and read optical heads 2a and 2b corresponding to the period of time T it takes for the detection signal index value to reach the threshold value after a mark has been recorded is determined. In the example shown in FIG. 10, as for the medium 1a, the write and read optical heads 2a and 2b may keep a distance L1 associated with the threshold value I between them. As for the medium 1b, on the other hand, the write and read optical heads 2a and 2b may keep a distance L2 associated with the threshold value II. These threshold values and distances determined are then stored in the nonvolatile memory 7 of the optical read/write apparatus.

Such preprocessing may be carried out not only before the user data starts to be written but also just before the apparatus is shipped. In that case, the optimum distance between the write and read optical heads 2a and 2b is saved in the nonvolatile memory 7 either on an environmental temperature basis or on a medium by medium basis just before the apparatus is shipped.

Next, Procedure 2 will be described. In Procedure 2, to write user data, the write optical head 2a records a mark on the optical disc 100. On the other hand, the read optical head 2b is separated from the write optical head 2a by the distance that has been determined in Procedure 1 (e.g., by the distance L1) and reads the signal when the recorded mark gets stabilized. And the signal detecting section 5b performs a verify operation on the data that has been written. This verify processing is carried out by retrieving, as a criterion for decision, the threshold value that has been obtained in Procedure 1 from the nonvolatile memory 7 and using that threshold value (which may be threshold voltage I, for example).

If a data write operation and a verify operation are sequentially performed using a single optical head, then the verify operation is performed intermittently, not continuously. For example, the verify operation may be performed at an interval of 200 ms, for example. However, the optical read/write apparatus of this embodiment includes the read optical head 2b, and therefore, can perform the verify operation at any arbitrary interval.

By making the distance between the write and read optical heads 2a and 2b variable, this optical read/write apparatus can shorten efficiently the time it takes to get the verify operation done since the write operation was started, compared to conventional apparatuses.

Also, the best distance between the write and read optical heads 2a and 2b may be determined by detecting the time it takes for the detection signal representing a jitter value, an asymmetry value, a β value or the degree of modulation to reach a predetermined value (i.e., the time it takes for a recorded mark to get stabilized).

<1-3. Effects>

As described above, if a recorded mark gets stabilized in a relatively short time, the time it takes to start the verify operation since a mark started to be recorded can be shortened according to this embodiment by changing the distance between the heads. That is why even if a write error has occurred for some reason, that error can be detected in a relatively short time and the condition for the write operation can be modified quickly.

If a write error has been spotted as a result of the verify operation, the data that has failed to be written as intended is written all over again on a spare area on the optical storage medium. In the read mode, data including the one that has not been written successfully is replaced with the data that has been written on the spare area. By shortening the interval between recording of a mark and start of the verify operation, the size of the data to be written on a spare area every time a write error occurs can be reduced. If a lot of spare area is to be secured, the area to write user data on should be cut down accordingly. According to this embodiment, however, the size of the data to be written on a spare area every time a write error is sensed can be reduced, and therefore, the spare area of a limited size can be used efficiently.

Embodiment 2

Next, an embodiment in which the optical read/write apparatus includes three optical heads will be described as a second embodiment. In the embodiment to be described below, the optical storage medium is also supposed to be an optical disc.

<2-1. Configuration>

Of the three optical heads 2a, 2b and 2c, the optical heads 2a and 2b are used for writing and the other optical head 2c is used for reading. The write optical heads 2a and 2b record marks at two different locations on the optical disc in parallel with each other, and the read optical head 2c reads the information that has been written by the write optical heads 2a and 2b.

Figure 12:
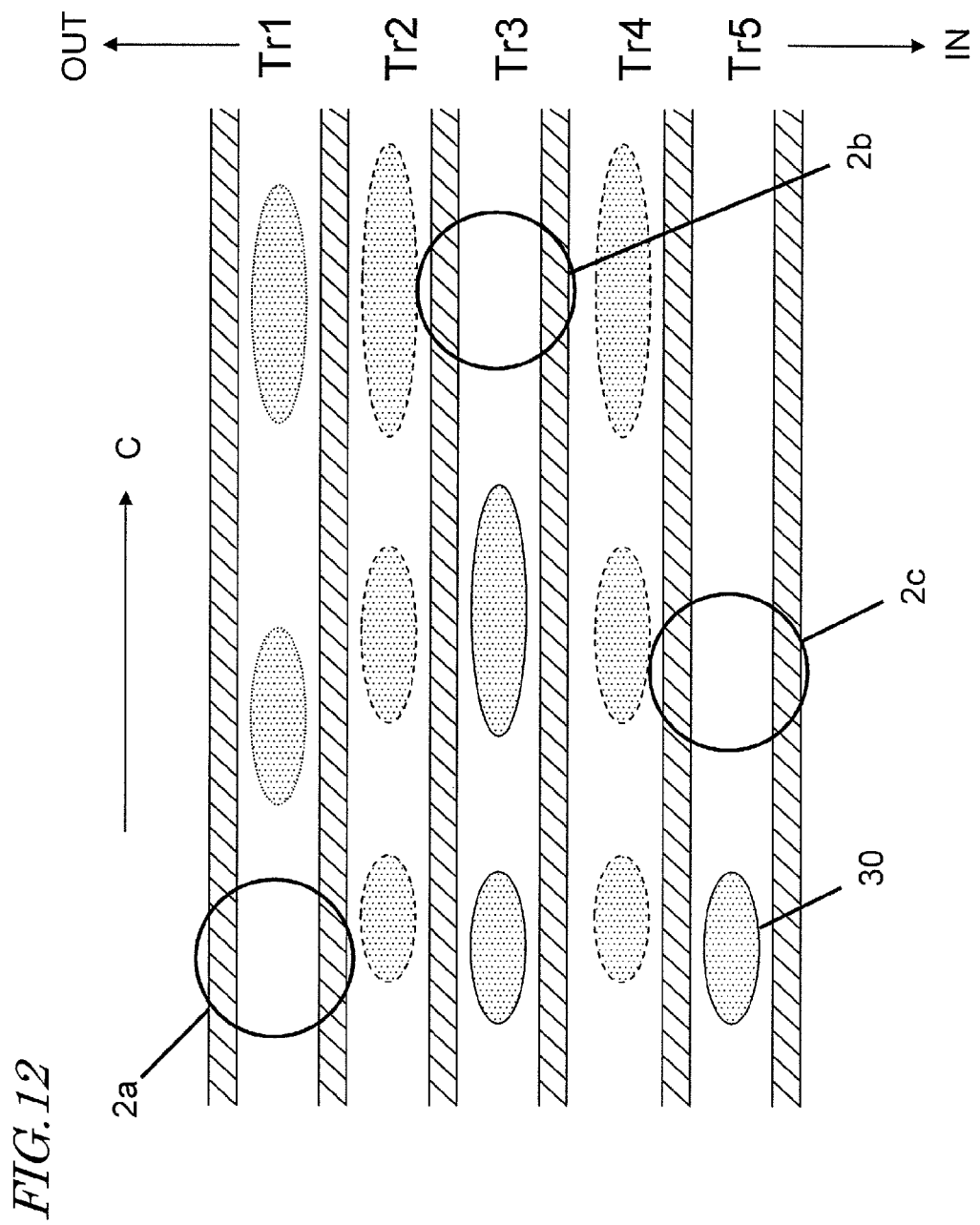
FIG. 12 Illustrates the relative arrangement of three optical heads with respect to an optical storage medium according to a second embodiment.

As shown in FIG. 12, these optical heads 2a, 2b and 2c are arranged so that the distance between the write and read optical heads 2a and 2c and the distance between the write and read optical heads 2b and 2c are optimized in the procedures that have already been described for the first embodiment. In this case, the time it takes for the single read optical head 2c to read the information that has been written by the two optical heads 2a and 2b becomes twice as long as the time it takes for a single read optical head to read the information that has been written by a single write optical head. That is why even if these optical heads are arranged at best positions, the time it takes to get the verify operation done since a write operation was started eventually becomes too long, which is a problem.

<2-2. Operation>

Figure 13:
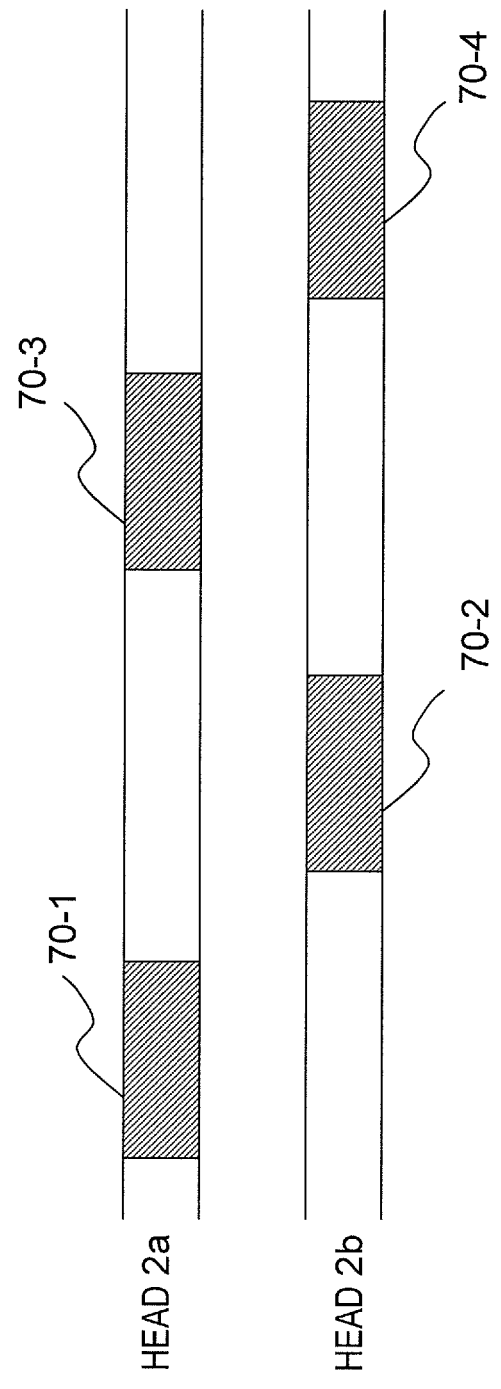
FIG. 13 Shows the order in which an optical head for reading reads the data according to the second embodiment.

FIG. 13 illustrates in what order the read optical head 2c performs its read operations according to this embodiment.

As shown in FIG. 13, the read optical head 2c alternately reads and verifies a predetermined number of samples of the information written by the write optical head 2a and the same number of samples of the information written by the write optical head 2b. In the example illustrated in FIG. 13, the read optical head 2c reads the data that has been written by the write optical head 2a in the period 70-1 and then reads the data that has been written by the write optical head 2b in the period 70-2. Subsequently, the read optical head 2c reads the data that has been written by the write optical head 2a in the period 70-3 and then reads the data that has been written by the write optical head 2b in the period 70-4.

<2-3. Effects>

By reading a predetermined number of samples, the read optical head 2c can accurately measure the level of a detection signal representing a jitter value, an asymmetry value, β value or the degree of modulation, and therefore, can perform a verify operation on both of the information written by the write optical head 2a and the information written by the write optical head 2b just as intended. In addition, by reading a predetermined number of samples of the information written by the write optical head 2a and the same number of samples of the information written by the write optical head 2b alternately, the time it takes to get the verify operation done since the write operation was started can be shortened compared to a situation where every pieces of the information written by the two write optical heads 2a and 2b is read sequentially.

According to this embodiment, the write and read optical heads 2a, 2b and 2c are arranged so that the distance between the write and read optical heads 2a and 2c and the distance between the write and read optical heads 2b and 2c are optimized following the procedures that have already been described for the first embodiment. In this manner, the decision can be made whether it is the verify OK state or verify NG state when the recorded mark gets stabilized. In addition, by reading a predetermined number of samples of the information written by the write optical head 2a and the same number of samples of the information written by the write optical head 2b alternately, the time it takes to get the verify operation done since the write operation was started can be shortened compared to a situation where every pieces of the information written by the two write optical heads 2a and 2b is read sequentially by a single optical head 2c. Consequently, the write operation can be performed with good stability even if little space is left in the buffer memory.

As can be seen, the present disclosure is also applicable to an optical read/write apparatus with three optical heads.

Although the first and second embodiments described above are supposed to be applied to an optical disc, the present disclosure is also applicable to a different type of storage medium such as an optical tape, in which the storage state changes with time, and is implementable as an optical read/write apparatus for reading, writing or erasing information from/on that type of optical storage medium.

Other Embodiments

Although first and second embodiments have been described herein as just an example of the technique of the present disclosure, various modifications, replacements, additions or omissions can be readily made on those embodiments as needed and the present disclosure is intended to cover all of those variations. Also, a new embodiment can also be created by combining respective elements that have been described for the first and second embodiments disclosed herein.

Thus, other embodiments will be described below collectively.

In the first and second embodiments described above, the optical storage medium is supposed to be an optical disc. However, the optical storage medium does not have to be an optical disc but may also be an optical tape such as the one shown in FIG. 14, which is a perspective view schematically illustrating a portion of an optical tape 105 on a larger scale. The optical tape 105 of this example may include a base film 204a, a back coating layer 204b that is adhered to the back surface of the base film 204a, and an imprint layer 204c that is supported by the base film 204a. On the upper surface of the imprint layer 204c, lands 204d and grooves 204e have been formed. Although not shown in FIG. 14, a reflective film and a recording material film are stacked over the entire upper surface of the imprint layer 204c. The optical tape 105 is extended in the longitudinal direction L and may have a length of several hundred meters, for example. Its width W may be set within the range of a few millimeters to several centimeters, and its thickness may be within the range of a few micrometers to several ten micrometers.

Figure 14:
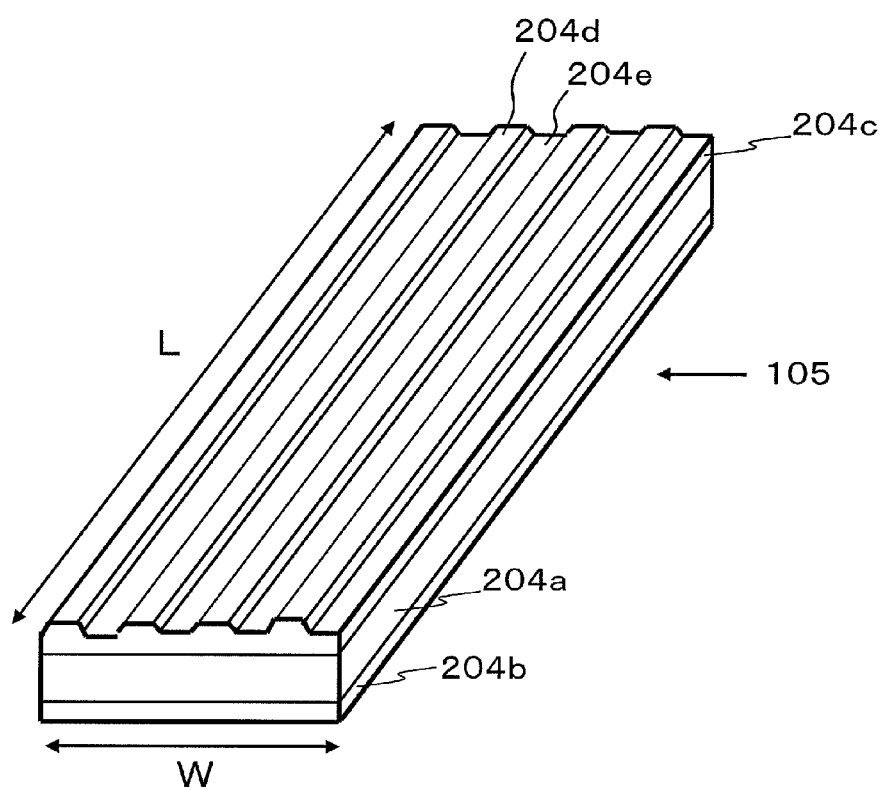
FIG. 14 A perspective view illustrating an example of an optical tape.

It should be noted that FIG. 14 illustrating the optical tape 105 is not to scale. Actually, the optical tape 105 may have several hundreds, or an even greater number, of lands 204d and grooves 204e. In one embodiment, data is written on either the lands 204d or the grooves 204e.

Various embodiments have been described as examples of the technique of the present disclosure by providing the accompanying drawings and a detailed description for that purpose.

That is why the elements illustrated on those drawings and/or mentioned in the foregoing detailed description include not only essential elements that need to be used to overcome the problems described above but also other inessential elements that do not have to be used to overcome those problems but are just mentioned or illustrated to give an example of the technique of the present disclosure. Therefore, please do not make a superficial decision that those inessential additional elements are indispensable ones simply because they are illustrated or mentioned on the drawings or the detailed description.

Also, the embodiments disclosed herein are just an example of the technique of the present disclosure, and therefore, can be subjected to various modifications, replacements, additions or omissions as long as those variations fall within the scope of the present disclosure as defined by the appended claims and can be called equivalents.

INDUSTRIAL APPLICABILITY

An optical read/write apparatus according to the present disclosure may be used in a bulk data storage system that includes a number of such apparatuses. An embodiment of the present disclosure can be used effectively as a read/write apparatus that not only saves a huge size of data as securely and as reliably as possible but also responds as quickly as possible.

REFERENCE SIGNS LIST 100 optical storage medium
1a, 1b medium
2a, 2b, 2b', 2b" optical head
3a, 3b laser control section
4a, 4b location control section
5a, 5b signal detecting section
6 controller
7 nonvolatile memory
8 buffer memory
10a, 10b track
30 recorded mark
20, 20a, 20b traverse unit
22a, 22b guide
105 optical tape
107 motor
1304 driver amplifier
1306 frontend signal processing section
1308 encoder/decoder
1309 CPU
1310 servo control section
204a base film
204b back coating layer
204c imprint layer
204d, 204e track

The invention claimed is:

1. An optical read/write apparatus with first and second optical heads, the apparatus comprising a control section which controls the positions of the first and second optical heads so that the relative arrangement of the first and second optical heads is changeable,
wherein the first optical head writes data on an optical storage medium by recording a mark on the optical storage medium, and
the second optical head reads the mark that has been recorded on the optical storage medium,
the control section being configured to change the relative arrangement of the first and second optical heads so that an interval between a start of recording the mark on the optical storage medium by the first optical head and a readout of the recorded mark by the second optical head is changed according to the type of the optical storage medium.

2. The optical read/write apparatus of claim 1, wherein the data to be written by the first optical head on the optical storage medium includes a signal to be used to perform a verify operation.

3. The optical read/write apparatus of claim 1, comprising a memory that stores information defining the relative arrangement of the first and second optical heads.

4. The optical read/write apparatus of claim 3, wherein the information defining the relative arrangement is information that indicates correspondence between the relative arrangement and the type of the optical storage medium.

5. The optical read/write apparatus of claim 1, wherein the control section determines the relative arrangement of the first and second optical heads by the index value of a detection signal to be obtained by getting the recorded mark on the optical storage medium read by the second optical head.

6. The optical read/write apparatus of claim 5, wherein the index value of the detection signal includes a jitter value, an asymmetry value, a β value, and the degree of modulation, and
wherein the control section determines the relative arrangement of the first and second optical heads so that the index value reaches a preset value.

7. The optical read/write apparatus of claim 1, wherein the control section changes the relative arrangement of the first and second optical heads according to the index value of the detection signal after user data has started to be written.

8. The optical read/write apparatus of claim 1, wherein the control section determines the relative arrangement of the first and second optical heads before user data starts to be written.

9. The optical read/write apparatus of claim 1, comprising another optical head.

10. The optical read/write apparatus of claim 1, wherein the control section has a mechanism that moves the first and second heads independently of each other.

* * * * *